J. G. LEYNER, DEC'D.
L. M. LEYNER, ADMINISTRATRIX.
ENDLESS TRACK OR BELT OR CHAIN TIGHTENING MECHANISM FOR TRACTION ENGINES AND FOR OTHER PURPOSES.
APPLICATION FILED NOV. 11, 1920.
1,419,156.
Patented June 13, 1922.
2 SHEETS—SHEET 1.
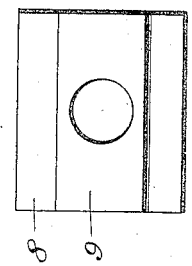
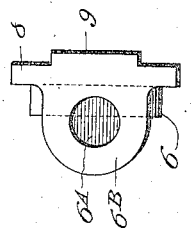
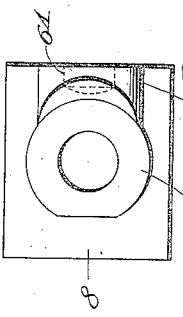
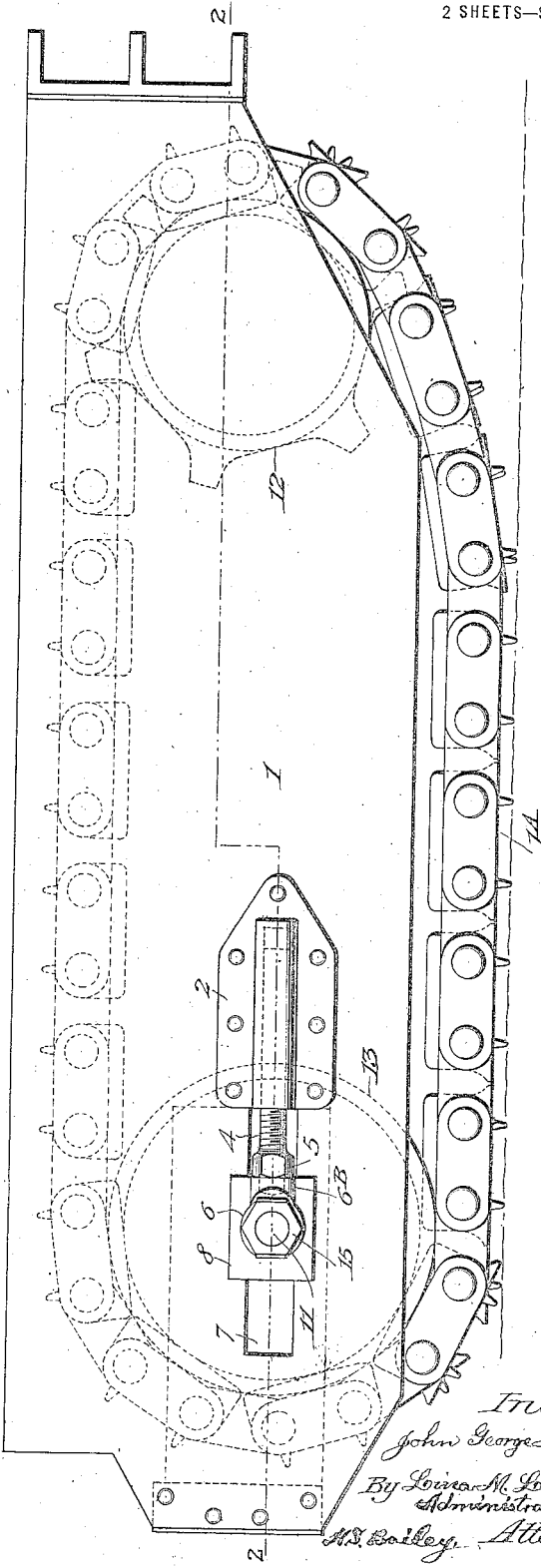

UNITED STATES PATENT OFFICE.

JOHN GEORGE LEYNER, DECEASED, LATE OF LITTLETON, COLORADO, BY LINA M. LEYNER, ADMINISTRATRIX, OF LITTLETON, COLORADO, ASSIGNOR TO THE LEYNER TRACTOR AND MANUFACTURING COMPANY, OF DENVER, COLORADO, A CORPORATION OF COLORADO.

ENDLESS TRACK OR BELT OR CHAIN TIGHTENING MECHANISM FOR TRACTION ENGINES AND FOR OTHER PURPOSES.

1,419,156. Specification of Letters Patent. Patented June 13, 1922.

Application filed November 11, 1920. Serial No. 423,435.

*To all whom it may concern:*

Be it known that JOHN GEORGE LEYNER, late a citizen of the United States of America, resident of Littleton, county of Arapahoe, and State of Colorado, did invent a new and useful Endless Track or Belt or Chain Tightening Mechanism for Traction Engines and for Other Purposes, of which the following is a specification.

The invention relates to an endless track, or belt, or chain tightening mechanism for traction engines, and for other purposes.

And the objects of the invention are:

First: to provide an adjustable tightening mechanism that can be applied to either one or to both ends of endless members of any kind.

Second: to provide an adjustable tightening mechanism that can be applied to either one or to both ends of the endless ground treading tracks of traction engines or to endless belts or endless chains.

Third: to provide a simple, practical and quickly adjusted tigthening mechanism that is especially adapted to the endless ground treading tracks of traction engines that have a driving sprocket wheel or some other kind of driving mechanism at the front end of the track and an idler roller at the inner or rear end of the track, and in which the said idler roller is mounted and arranged to be moved by the tightening mechanism to establish and maintain the proper operative tension of the track on its supporting rotating members.

These objects are attained by the mechanism illustrated in the accompanying drawings, in which:

Figure 1 is a side elevation of the front member of a tractor, equipped with the improved endless track tightening mechanism.

Fig. 3 is a front view of one of the slidable bearing blocks which support the drum shaft of the tractor.

Fig. 4 is an end view of the same.

Fig. 5 is a rear view thereof.

Similar letters of reference refer to similar parts throughout the several views.

Figure 2:
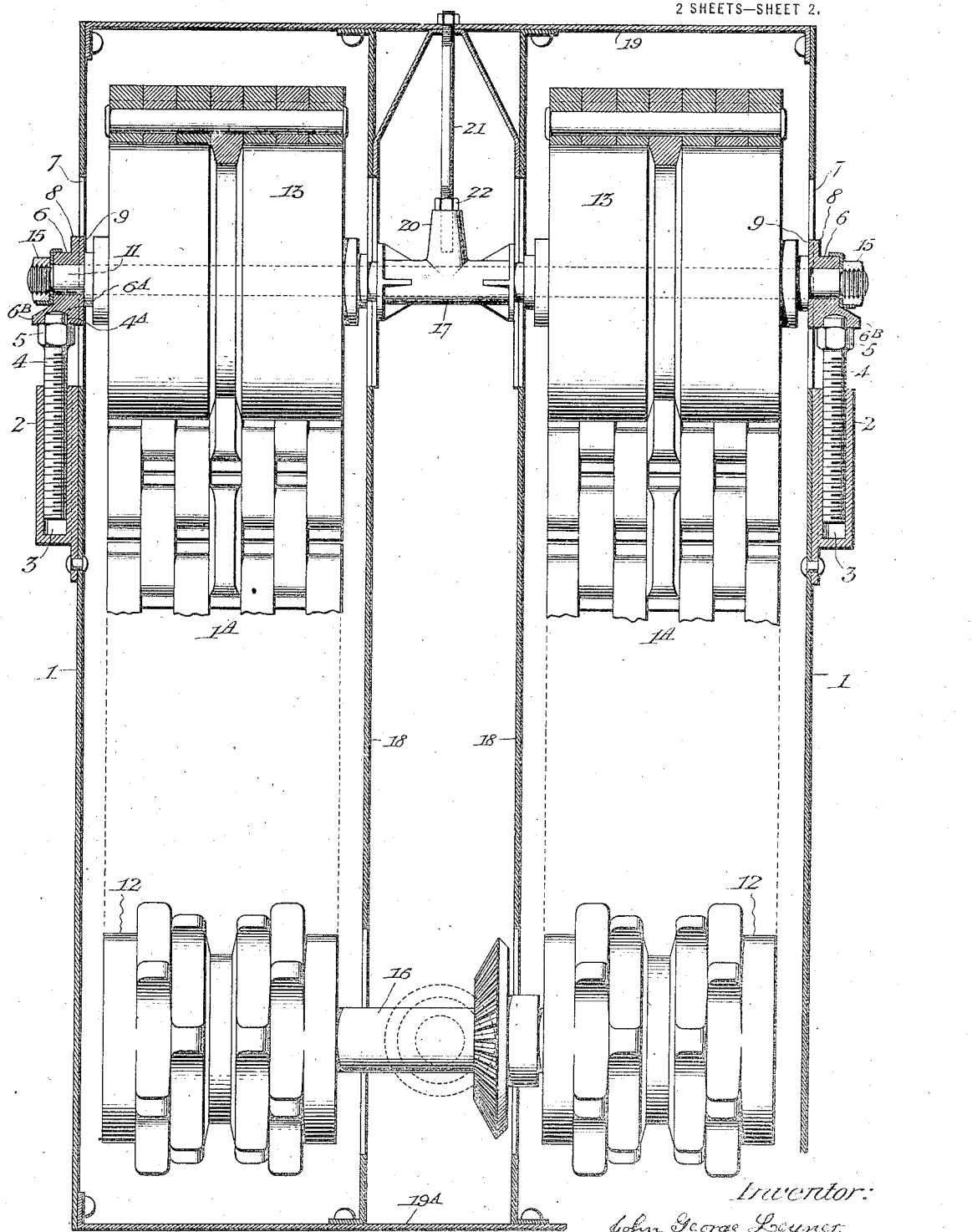
Fig. 2 is a horizontal sectional view on the line 2—2 of Figure 1, the drums and sprocket wheels being shown in elevation.

Referring to the drawings:

The numeral 1, designates a part of the supporting mechanism of any part of the housing of an endless track, or of a belt or of a chain that is mounted in any suitable manner and that is arranged to be driven to perform any desired work.

In Figure 1, this supporting member represents the outside guard plate of the housing that surrounds an endless ground treading track 1$^A$, that is adapted to be used to propel traction engines. This endless track and its surrounding housing is fully illustrated in the pending application, Serial No. 374,723, filed April 17, 1920, for ground treading endless traction tracks and their supporting trucks.

To the side of this member 1, a lug member 2, is secured, of if preferred, it may be formed integral with the member 1. This lug member 2, is provided with a long threaded aperture 3, in which one end of a threaded rod 4, is threaded to extend part way, and the rod is threaded along its length far enough to permit it to be turned wholly into, and it is also arranged to be turned partially out of this threaded aperture 3. The outer end of this threaded rod is provided with a wrench receiving head portion 5, that is preferably of hexagon form, and is formed integral with the threaded rod, and this head portion of the threaded rod engages the adjacent side of a sliding block 6, that is slidingly mounted in an elongated slot 7, that is formed in the supporting member 1. A short terminal lug 4$^A$, is formed on the head 5, that projects into a recess 6$^A$, that is formed in the block to receive it. The outside surface of the block is provided with a projecting lug portion 6$^B$, in the end of which the recess 6$^A$, is partially formed.

The block consists of a plate portion 8, that bears against the side of the supporting member 1, and it is provided with a hub portion 9, that extends into and fits closely but slidably in between the top and bottom walls of the slot 7.

The block 6, forms the journal bearing block or box of the shaft 11, which shaft 11, may be arranged to extend either rotatingly through the box, or non-rotatively through it, as desired. That is, the roller 13, may be secured to the shaft 11, or it may be rotatively mounted on the shaft 11. The roller is preferably illustrated mounted rotatively on the shaft, and the shaft extends snugly through the journal blocks 6.

The invention contemplates any means for supporting the opposite end and also for driving any track, or belt, or chain that the adjustable tightening mechanism can be secured to, but it will preferably be illustrated in connection with an endless track laying track, such as illustrated in the above mentioned application. And in the case of a track or of a belt or a chain, it is necessary to take up the slack at either one or the other of the two opposite ends of either of these endless members. In the case of the track, the idler roller or drum 13, is placed at the inner or rear end of the track and the driving member, which, as illustrated, is a sprocket wheel, 12, but which may be, if desired, friction rollers or bevel or worm gearing, either one of which may be used to operatively drive the endless track, or belt or chain. These last two mentioned features are not illustrated, but in Figure 1, is illustrated a fragment of an endless chain traction engine track mounted at its forwardly driving end on a sprocket wheel 12, and at its rear end on an idler supporting roller 13, in order to illustrate the application of the invention to the stretching and maintaining of an endless track or chain or belt of any kind or character of driving and supporting members.

It is also necessary that the opposite, or both ends of the shaft 11, be provided with the same lateral adjustment mechanism, and in Figure 2, is illustrated a cross sectional view of the roller 13, and of an endless tractor track 1ᴬ, and of the shaft 11.

The opposite ends of the shaft 11, are threaded, and nuts 15, are threaded to them, and the nuts may be secured to the ends of the shaft 11, of the roller by any desired form of nut lock, as for instance by means of a pliable washer as indicated.

The invention contemplates, however, any arrangement and means of securing the supporting roller to the shaft, and also any means at the ends of the shaft for securing the journal bearing blocks or boxes against the sides of the plates, and any substitutes for the plates themselves that will operatively support the adjustable threaded rod and its threaded aperture and the journal block.

The operation of the improved track or belt or chain tightening mechanism is as follows: Assuming that it has been operatively mounted on rollers at either one end or the other on roller drums or sprocket wheels, or as illustrated; it is necessary that it be tightened sufficiently to run smoothly and evenly over its supporting members. And to accomplish this, the endless track or other mechanism, as soon as the track is mounted on its supporting and driving members, is tightened into an operative running position, and this is done by forcing the opposite ends of the roller supporting shaft away from the sprocket wheel, and this movement of the shaft at its ends and consequently throughout its length, is effected by applying a wrench to the head 5, of the threaded rod 4, and turning it to move the journal blocks 6, that support the opposite ends of the shaft away from the sprocket wheel, which tightens the endless track, which is thus moved until the endless track is put under the operative tension desired.

In Figure 2 of the drawings, the tightener is applied to a tractor truck member having parallel endless tracks 1ᴬ, and in this arrangement two drums 13, and two sprocket wheels 12, are employed, each pair of drums being mounted on the shaft 11, and each pair of sprocket wheels being mounted on a shaft 16. A spacing sleeve 17, is mounted on the shaft 11, between the drums, and parallel inner plates 18, extend the length of the truck adjacent the inner ends of the roller 11, and sprocket wheels 12, and are bolted to the end plates 19 and 19ᴬ. The central portion of the shaft 11, is braced against the tension of the endless tracks, in the following manner: The sleeve 17, has a projecting lug 20, in which one end of a rod 21, is threaded and held against turning by a jam nut 22. The outer end of the rod 21, is threaded and extends through a hole in the adjacent end plate 19, and a nut is screwed on this end of the rod and against the plate, and in this way the central portion of the shaft is braced so that the whole shaft is held in a perfectly straight line. The rear end plate 19, is braced against the pull of the rod 21, by a yoke-shaped brace 23, the closed end of which rests against the end plate 19, and is apertured to receive the rod 21, while its free ends are rigidly secured to the parallel side plates 18.

The invention provides a simple, positive and reliable mechanism for tightening and taking up the slack occasioned by the wear of the many pivotal joints of endless ground treading tracks and of all forms of link belting, and of endless chains to which it can be attached, and while there is illustrated the preferred construction and arrangement of the endless member tightening mechanism, it is not wished to be limited to that illustrated and described, as changes may be made in it without departing from the invention.

Having described the invention, what is claimed as new and desired to be secured by Letters Patent, is:

1. In combination with a tractor frame having horizontally slotted side plates, a shaft having journal portions passing through the slots, journal blocks having sliding movement in the slots, means for securing the journal blocks to the ends of the shaft, a threaded socket on each plate in alignment with each slot and a rod having at one end threaded engagement in the threaded socket and projecting at the other end into the block and having a shoulder bearing against the block.

2. In combination with a tractor frame having horizontally slotted side plates, a shaft having journal portions passing through the slots, journal blocks having a sliding fit in the slots, means for securing the journal blocks to the ends of the shaft, a threaded rod bearing at one end against the journal block, a socket on each plate in alignment with a slot, the socket and rod having an extended screw threaded engagement, and means on the rod affording a wrench grip.

3. In a tightening device of the character described, a frame comprising side and end plates, rotatable driving members mounted in said end of said frame, bearing blocks slidably mounted in the side plates of the other end of the frame, a shaft mounted in said bearings, drums on said shaft and endless elements mounted on said drums and said driving members, in combination with means for tightening said endless elements, comprising internally threaded abutments on said side plate, rods threaded to said abutments, and in bearing engagement with said bearing blocks, a sleeve on the shaft between said drums, a rod secured at one end to said sleeve and extending through the adjacent end plate, and a nut threaded to the end of said rod and against said end plates.

4. In a tightening device of the character described, a frame comprising side and end plates, bearing blocks slidably mounted in slots in said side plates adjacent one end of the frame, a shaft mounted in said bearings, drums mounted on said shaft, driving members mounted in the other end of the frame, endless elements mounted on said drums and said driving members, means for tightening and maintaining the tension of said endless elements, comprising internally threaded abutments rigidly mounted on said side plates, rods in threaded engagement with said abutments, their free ends entering sockets in said bearing blocks, said rods having a wrench receiving portion whereby when the rods are turned, the bearing blocks are moved forward in their slots, and means for bracing the center portion of the drum shaft against the pull of the endless elements, comprising a sleeve on said central portion having a projection provided with a threaded aperture, a rod, one end of which is threaded to said aperture, its opposite end extending through the adjacent end plate, a nut threaded on said end and against said end plate, and means for bracing said end plate against the pull of said rod.

In testimony whereof I affix my signature.

Mrs. LINA M. LEYNER,
*Administratrix of John George Leyner, deceased.*